United States Patent [19]

Fourrey et al.

[11] Patent Number: 4,804,225
[45] Date of Patent: Feb. 14, 1989

[54] BASE STRUCTURE IN PARTICULAR FOR A SEAT HAVING AN ADJUSTABLE BACKREST

[75] Inventors: Francois Fourrey, Montbeliard; Serge Deley, Seloncourt, both of France

[73] Assignee: Cycles Peugeot, France

[21] Appl. No.: 928,483

[22] Filed: Nov. 10, 1986

[30] Foreign Application Priority Data

Aug. 14, 1986 [FR] France ............................. 86 11757

[51] Int. Cl.⁴ .............................................. A47C 31/00
[52] U.S. Cl. ..................................... 297/452; 297/354
[58] Field of Search ............... 297/452, 454, 354, 353, 297/451, 445, 462

[56] References Cited

U.S. PATENT DOCUMENTS

| 1,587,706 | 6/1926 | Dozier | 297/452 |
| 2,636,551 | 4/1953 | Simon | 297/462 |
| 3,069,204 | 12/1962 | Vesterholt et al. | 297/445 X |
| 3,184,227 | 5/1965 | Viall, Sr. | 297/454 |
| 3,248,745 | 5/1966 | Gunlock | 297/454 X |
| 3,329,466 | 7/1967 | Getz et al. | 297/452 X |
| 3,501,200 | 3/1970 | Ohta | 297/454 |
| 3,656,808 | 4/1972 | Chang | 297/445 |
| 4,057,214 | 11/1977 | Harder, Jr. | 297/452 X |
| 4,188,983 | 2/1980 | Graham et al. | 297/445 X |
| 4,218,091 | 8/1980 | Webster | 297/354 |
| 4,545,614 | 10/1985 | Abu-Isa et al. | 297/452 X |
| 4,580,840 | 4/1986 | Cunningham et al. | 297/452 |
| 4,623,114 | 11/1986 | Nishino | 297/452 X |
| 4,627,660 | 12/1986 | Kon | 297/452 X |

FOREIGN PATENT DOCUMENTS

| 3426172 | 2/1985 | Fed. Rep. of Germany | 297/452 |
| 510362 | 8/1939 | United Kingdom | 297/454 |
| 814690 | 6/1959 | United Kingdom | 297/354 |

Primary Examiner—Kenneth J. Dorner
Assistant Examiner—José V. Chen
Attorney, Agent, or Firm—Sughrue, Mion, Zinn, Macpeak & Seas

[57] ABSTRACT

The structure comprises a tubular substantially helical element (16) which forms in succession a base contour (22) and then a member (24, 26) for connection to the floor on which the seat is placed. The upper end portion (18) of the element has extending therethrough a pivot pin (20) for connection to one of the sides of a backrest (1) and is connected by gussets (38, 40) to the connection member The opposite end portion (52) of the tube is connected to the base contour frame by gussets (30, 32). Any force exerted by the backrest on the upper end portion (18) of the tube tends to unwind the substantially helical element and is thus absorbed by the latter.

6 Claims, 2 Drawing Sheets

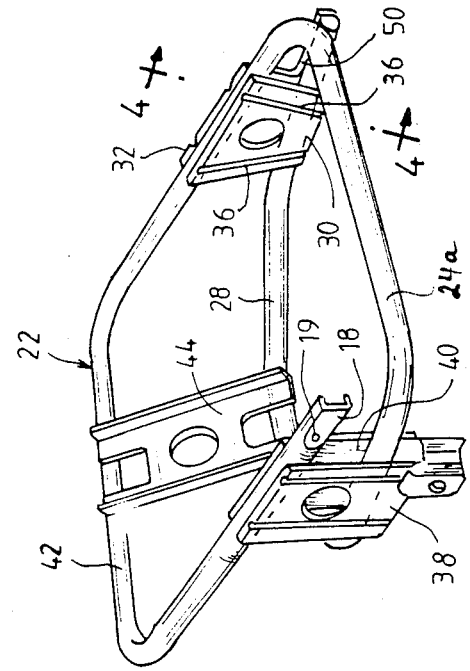
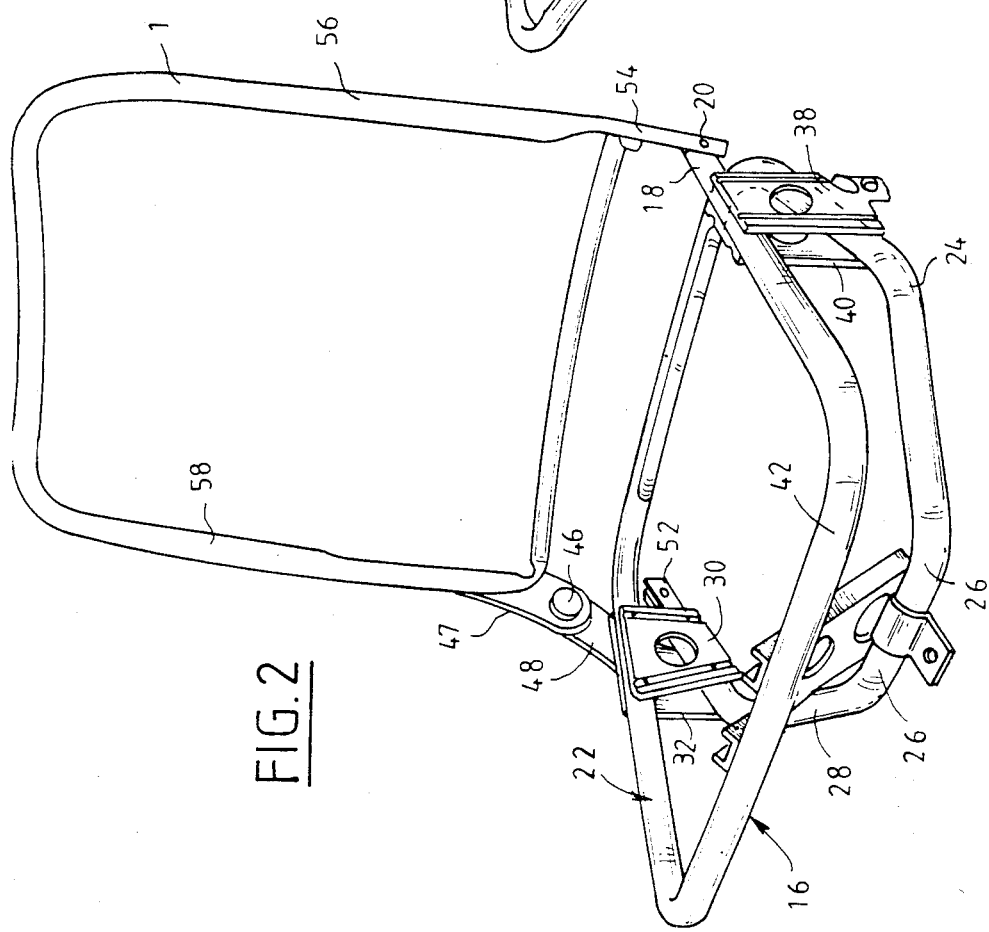

BASE STRUCTURE IN PARTICULAR FOR A SEAT HAVING AN ADJUSTABLE BACKREST

The present invention relates to a base structure for a seat and in particular a motor vehicle seat which is more particularly adapted for seats provided with a backrest having an adjustable inclination controlled by an adjusting device mounted on one of its sides.

Seats having an adjustable backrest in general use at the present time have two devices for adjusting the inclination each mounted on one of the sides of the seat and driven simultaneously by a common control element. However, it is well known that this arrangement creates construction problems for the constructors, since the two devices must be interconnected in a precise manner so that their displacement is strictly synchronized. Consequently, in a number of cases, in particular for economic reasons, only a single device for adjusting the position of the backrest is employed, which device is therefore mounted on one of the sides of the seat, a simple pivot pin interconnecting the frames of the backrest and seat on the other side.

The inclination of the backrest may thus be adjusted in an effective manner, but, unfortunately, the seat has a tendency to be deformed when it is subjected to a rearwardly directed force exerted on the top of the backrest. Indeed, this force is transmitted in a dissymetrical manner to the floor through the base structure so that it tends to cause a twisting of the latter, i.e. a relative angular displacement between the contour frame of the base structure and an element for connection to the floor connected to this frame by gusset plates. These gusset plates are then subjected to a large torsional force which rapidly impairs them.

An object of the present invention is to overcome this drawback by providing a base structure which is both light, rigid and only slightly deformable, even under the action of a force exerted rearwardly on the top of the backrest.

The invention therefore provides a base structure which is constituted by a helical element forming in succession the contour frame of the base and the element for connection to the floor and provided at one of its ends with means for pivotally connecting the backrest.

The helical shape of the element of the base structure, which is moreover preferably made from a tube, ensures great rigidity of this structure which provides an opposition to the twisting force which is the greater as this force tends to unwind a helix that the base structure element forms.

It will be understood that the upper and lower coils of the helix are interconnected by gussets but the latter no longer undergo torsional stress.

The following description of an embodiment, which is given by way of a non-limiting example and represented in the accompanying drawings, will bring out the features and advantages of the invention.

In the drawings:

FIG. 2 is a perspective view to an enlarged scale of a seat including a base structure according to the invention, seen from the front end of the seat;

FIG. 3 is a perspective view of the base structure viewed from the rear of the seat.

Figure 1:
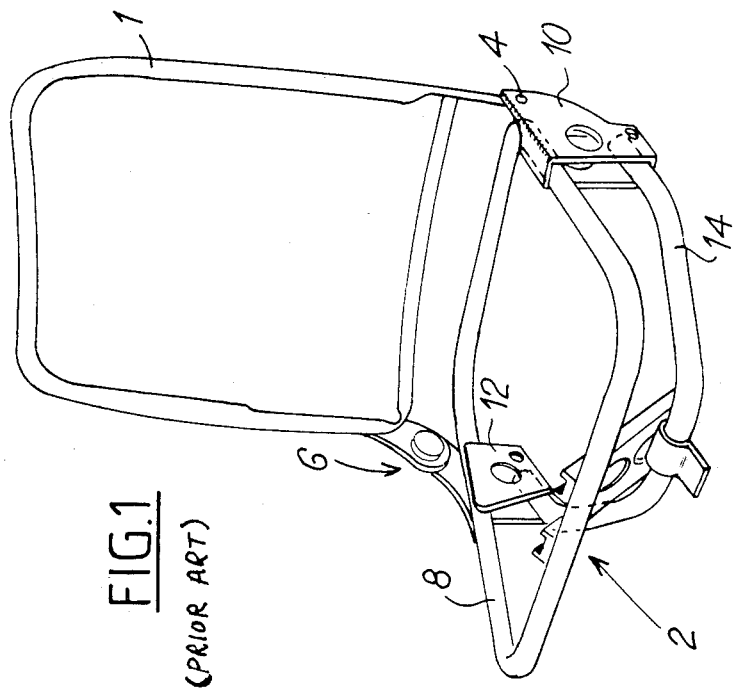
FIG. 1 is a diagrammatic perspective view of a seat having an adjustable backrest including a conventional base structure.

As shown in FIG. 1 of the drawings, which represents a seat of the prior art, the invention is more particularly adapted for seats having an adjustable backrest, and in particular for motor vehicle seats whose backrest includes a reinforcing frame 1 adapted to carry a lattice structure and to be covered by padding (not shown). This frame 1 is connected to a base structure 2, on one side by a simple pivot pin 4 and, on the other side, by a device 6 for adjusting its inclination.

The bsse structure 2 also includes a reinforcing frame 8 which is closed and connected on the two opposed lateral sides by gussets, respectively 10 and 12, to an element 14 for connection to the floor of the vehicle.

The pivot pin 4 between the backrest and the base structure extends preferably through the corresponding gusset 10 but may of course also extend through the frame 8 itself if desired.

In any case, a rearwardly directed force exerted on the top of the backrest, i.e. at the top of the frame 1, tends to tilt this frame, i.e. to push its lower part forwardly. However, as this lower part is very firmly retained by the device 6 for adjusting the inclination, while the pivot pin 4 opposes a much lower resistance, the frame 8 tends to move angularly relative to the floor connection element 14, so that the whole of the base structure is subjected to a twisting effect and the gussets 10 and 12 are subjected to a considerable torsional force which tends to deteriorate them rapidly.

In order to overcome this drawback, the base structure according to the invention shown in FIGS. 2 and 3 comprises a tubular element 16 which is substantially helically coiled and has an upper end portion 18 on a first lateral side of the seat base structure (left side of the seat for the occupant of the seat is provided with an aperture 19 adjacent to said end 18 for the passage of a pivot pin 20 for connecting it to the lower end portion of a lateral upright of the frame 1 of the backrest.

Extending from this end portion 18 is an upper coil portion 22 of the tubular element 16 which constitutes a seat base contour frame which is progressively downwardly inclined and is connected by a rear coil portion 24a to a lower coil portion 24 having a central front coil part 26 which is in contact with the floor of the vehicle. A rearwardly extending rear end portion 28 of the lower coil portion 24 of the helical element 16 then extends slightly toward the upper coil portion 22 constituting the base contour frame and is fixed to this upper coil portion 22 by two gussets 30 and 32 respectively on a second lateral side of the seat base structure opposite to the aforementioned first lateral side (that is, the right side of the seat for the occupant of the seat).

Figure 4:
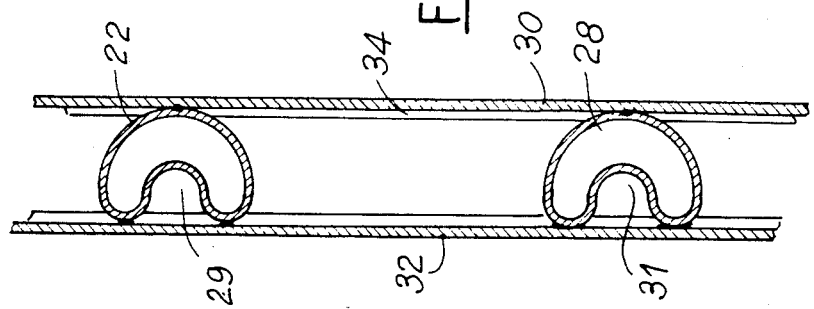
FIG. 4 is a sectional view taken on line IV—IV of FIG. 3.

The gussets 30 and 32 are preferably each formed by a flat plate provided with two ribs 34, 36 which project from one of the sides of the gusset and are placed on each side of two tube portions which constitute the upper coil portion 22 and the rear end portion 28 of the lower coil portion helical element 24 of the 16 so that their ribs 34 and 36 are in contact with these tube portions. Further, these tube portions are locally pushed in at 29, 31, which increases their stiffness and facilitates their welding to the two gussets, since they are welded, as shown in FIG. 4, along a generatrix to the gusset 30 and along two generatrices to the gusset 32.

The part of the upper coil portion 22 adjacent to end 18 of the helical element 16 on said first lateral side of the seat base structure is also connected to the lower coil portion 24 by two gussets 38 and 40 respectively welded on each side of these two portions of the element 16. The two gussets 38 and 40 preferably include, as the gussets 30 and 32, projecting ribs facing the tubes so as to facilitate the welding thereof.

Likewise, the front parts 26 and 42 of the lower coil portion 24 and upper coil portion 22 constituting the base contour frame are interconnected by a U-sectioned plate 44 which is partly apertured.

The base structure constructed in this way is adapted not only to be connected to the frame 1 of the backrest by the pivot pin 20 adjacent to the end 18 of the upper coil portion 22, but also to be connected on said second lateral side of the seat base structure to the other side of the backrest by a device for adjusting the inclination of the backrest diagrammatically shown at 46 in FIG. 2. This device is carried by two side walls 47 and 48 respectively, one of which is fixed to the tube of the frame 1 while the other is fixed to the base structure element 16 by the gusset 32, preferably by means of two fixing elements, one of which extends through the gusset 32 and the tube of the frame 22, while the other extends through a tab 50, extending the gusset 32, and the end portion 52 of the helical element 16.

When a force is exerted in the rearward direction on the top of the frame tube 1, i.e. on the top of the backrest, the lower part 54 of the tube of the frame 1 which carries the pivot pin 20 tends to move forwardly of the seat and to exert a push on the end 18 of the upper coil portion 22 of the helical element 16 which tends to unwind this helical element. Now, this element is preferably made from a tube which has a high compressive strength so that it opposes the force exerted by the backrest by a great resistance which prevents the displacement of the lower part 54 and thus avoids any risk of a twisting of the base structure. The resisting element 16 is thus the sole element stressed by the force exerted by the tube of the backrest, while the gussets 30, 32, 38 and 40 merely have the function of ensuring the connection between the upper coil portion 22 and the lower coil portion 24 of the helical tube 16 of the base structure. These gussets are consequently made preferably from a relatively thin sheet and they may include, as shown, apertures which lighten them.

As the helical element 16 is lighter than the conventional connection of a seat base contour frame to an element for mounting on the floor of the vehicle the structure according to the invention as a whole is both distinctly lighter than the conventional structure and less deformable. It is also easier to construct and consequently cheaper than conventional structures, so that it is particularly adapted for seats which, for reasons of economy, have only a single device for adjusting the inclination of the backrest located on one of the sides of the backrest.

It will be understood that the backrest associated with a base structure according to the invention may have a tube of the frame 1 which is merely bent into an inverted U shape or, as shown in the drawings, a frame tube which is bent onto itself so as to form a substantially closed frame. One of the uprights 56 of this frame is then extended by the lower portion or arm 54 which carries the pivot pin 20 while, on the opposite side of the frame, the other upright 58 carries the side wall 47 of the inclination adjusting device.

Further, the base structure according to the invention could be used with a seat having a fixed backrest or even a seat provided with two adjusting devices which are interconnected and connected to a common control element.

What is claimed is:

1. A seat base structure in combination with an inclinable backrest and having a first lateral side and a second lateral side laterally spaced from and opposite said first lateral side, and means for adjusting the inclination of the backrest relative to the seat base structure, said seat base structure comprising a substantially helically coiled element which has an upper coil portion for receiving a seat and terminates in a first end of said element on said first lateral side of said base structure, and a lower coil portion terminating in a second end of said element which is an opposite end of said element relative to said first end and is located on said second lateral side of said seat base structure, and an intermediate coil portion interconnecting said upper coil portion and said lower coil portion, said lower coil portion being provided for fixing to a support and being vertically spaced from said upper coil portion, said backrest having a first lower end portion which is freely pivotally mounted on said upper coil portion adjacent to said first end of said element and a second lower end portion which is pivotally mounted on said upper coil portion of said element in the vicinity of said second end of said element on said second lateral side of said seat base structure, said means for adjusting the inclination of the backrest consisting of a single adjusting device combined with said pivotal mounting of the second lower end portion of the backrest on said second lateral side of said seat base structure, and reinforcing means rigidly interconnecting said upper coil portion and said lower coil portion on said first and second lateral sides of said seat base structure.

2. A seat base structure according to claim 1, wherein said element is a tubular element.

3. A seat base structure according to claim 1, wherein said reinforcing means comprise gussets.

4. A seat base structure according to claim 3, wherein said gussets are fixed in the vicinity of each of said ends of the element.

5. A seat base structure according to claim 3, wherein the gussets include ribs which project toward said substantially helical element and welds are provided between said element and said ribs for securing said gussets to said element.

6. A seat base structure according to claim 1, wherein said upper coil portion is substantially contained in a plane which is downwardly inclined rearwardly of the seat base structure and said spacing between said upper coil portion and said lower coil portion decreases in a direction rearwardly of the seat base structure.

* * * * *